(12) United States Patent
Shah et al.

(10) Patent No.: US 10,752,554 B1
(45) Date of Patent: Aug. 25, 2020

(54) INTERMETALLIC MATRIX COMPOSITE

(71) Applicant: United Technologies Corporation, Farmington, CT (US)

(72) Inventors: Dilip M. Shah, Glastonbury, CT (US); Venkatarama K. Seetharaman, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/690,367

(22) Filed: Nov. 21, 2019

(51) Int. Cl.
*C04B 35/58* (2006.01)
*C04B 41/51* (2006.01)
*C04B 14/32* (2006.01)
*C04B 14/30* (2006.01)

(52) U.S. Cl.
CPC ...... *C04B 35/58092* (2013.01); *C04B 14/303* (2013.01); *C04B 14/324* (2013.01); *C04B 41/51* (2013.01)

(58) Field of Classification Search
CPC ... C22C 30/00; C04B 35/58092; C04B 41/51; C04B 14/324; C04B 14/303
See application file for complete search history.

(56) References Cited

U.S. PATENT DOCUMENTS

| | | | |
|---|---|---|---|
| 5,294,489 | A | 3/1994 | Luthra et al. |
| 5,403,790 | A | 4/1995 | Claar et al. |
| 6,200,526 | B1 | 3/2001 | Fox et al. |
| 9,593,049 | B2 | 3/2017 | Harris et al. |
| 10,040,724 | B2 | 8/2018 | Makurunje et al. |
| 2017/0073277 | A1 | 3/2017 | Shim et al. |

OTHER PUBLICATIONS

Dilip M. Shah and Donald L. Anton, "Alumina fiber reinforced intermetallic matrix composites", ISSI: Structural Intermetallics, Sep. 1993, pp. 755-764, The Minerals, Metals & Materials Society (TMS), Warrendale, Pennsylvania.

Dilip M. Shah et al., "In-situ refractory intermetallic-based composites", Materials Science and Engineering: A, Feb. 28, 1995, pp. 658-672, vols. 192-193, Part 2, Elsevier Science S.A., Lausanne, Switzerland.

Yan-Ling Hu et al., "Microstructure and phase stability in a Nb—Mo—Cr—Al—Si alloy", Journal of Materials Science, Oct. 30, 2008 (online), pp. 7013-7025, vol. 43, Issue 22, Springer US, New York, New York.

*Primary Examiner* — Jessee R Roe
(74) *Attorney, Agent, or Firm* — Bachman & LaPointe, P.C.

(57) ABSTRACT

An intermetallic matrix composite has an intermetallic matrix and a ceramic reinforcement. The intermetallic matrix comprises, in atomic percent: 28.0±2.0 Nb; 27.0±2.0 Mo; 27.0±2.0 Cr; 9.0 ±2.0 Si; 9.0 ±2.0 Al; and no more than 10.0 other alloying elements and impurities, if any.

20 Claims, 4 Drawing Sheets

INTERMETALLIC MATRIX COMPOSITE

BACKGROUND

The disclosure relates to high temperature aerospace intermetallic matrix composites. More particularly, the disclosure relates to turbine engine vanes, blades, blade outer air seals (BOAS), and the like.

An attempt at intermetallic compositing via hot pressing in Dilip M. Shah and Donald L. Anton, "Alumina fiber reinforced intermetallic matrix composites", ISSI: Structural intermetallics, 1993, pp. 755-764, TMS, Warrendale, Pa. In an exemplary process, an intermetallic is cast and powdered such as via mechanical attrition or atomization. The powder is then mixed with reinforcement fibers or into a fiber preform. The mixture is then hot pressed to fully consolidate into a composite.

Due to deficiencies in the hot pressing, an in situ formation technique has been proposed. This technique omits the fiber reinforcement. In such an in situ technique, a long rod of the intermetallic is prepared by direct casting or by powder metallurgical consolidation. The rod is reprocessed by zone melting to traverse the melt region along the rod length to cause directional solidification. The term "composite" is used due to the presence of multiple phases in a coarse microstructure causing behavior characteristic of composites.

Such an in situ technique is disclosed in Dilip M. Shah et al., "In-situ refractory intermetallic-based composites", Materials Science and Engineering: A, Feb. 28, 1995, pp. 658-672, Volumes 192-193, Part 2, Elsevier Science S. A., Lausanne, Switzerland. An intermetallic of Nb-27Mo-27Cr-9Al-9Si (in at. %) is one identified material. Separately, an intermetallic of that Nb-27Mo-27Cr-9Al-9Si (in at. %) is discussed in Yan-Ling Hu et al., "Microstructure and phase stability in a Nb—Mo—Cr—Al—Si alloy", Journal of Materials Science, Oct. 30, 2008 (online), pp. 7013-7025, Volume 43, Issue 22, Springer US, New York, N.Y.

Additionally, ceramic matrix composites (CMC) have been formed such as by infiltrating liquid Si (melting point 2577° F.) into an SiC fiber preform.

SUMMARY

One aspect of the disclosure involves an intermetallic matrix composite comprising: an intermetallic matrix; and a ceramic reinforcement. The intermetallic matrix comprises, in atomic percent: 28.0±2.0 Nb; 27.0±2.0 Mo; 27.0±2.0 Cr; 9.0 ±2.0 Si; 9.0 ±2.0 Al; and no more than 10.0 other alloying elements and impurities, if any.

A further embodiment of any of the foregoing embodiments may additionally and/or alternatively include the intermetallic matrix comprising a eutectic wherein two phases combine to form at least 60% by volume of the matrix and each is at least 25% by volume of the matrix.

A further embodiment of any of the foregoing embodiments may additionally and/or alternatively include the two phases being: a first phase being of the type $Cr_2Nb$ with C14/C15 crystal structure; and a second phase being of the type $Cr_3Si$ with A15 crystal structure.

A further embodiment of any of the foregoing embodiments may additionally and/or alternatively include the intermetallic matrix comprising a third phase forming 25% to 35% by volume of the matrix and comprising: a majority by weight and volume Nb—Cr—Mo solid solution with A2 structure.

A further embodiment of any of the foregoing embodiments may additionally and/or alternatively include the intermetallic matrix comprising, in atomic percent: 28.0±1.0 Nb; 27.0±1.0 Mo; 27.0±1.0 Cr; 9.0±1.0 Si; and 9.0±1.0 Al.

A further embodiment of any of the foregoing embodiments may additionally and/or alternatively include the intermetallic matrix further comprising for said other alloying elements, in atomic percent: 0.2 to 2.0 Sn.

A further embodiment of any of the foregoing embodiments may additionally and/or alternatively include the intermetallic matrix further comprising for said other alloying elements, in atomic percent: 0.2 to 2.0 Re.

A further embodiment of any of the foregoing embodiments may additionally and/or alternatively include the intermetallic matrix further comprising for said other alloying elements, in atomic percent: 0.2 to 2.0 Sn and 0.2 to 2.0 Re.

A further embodiment of any of the foregoing embodiments may additionally and/or alternatively include the intermetallic matrix further comprising, in atomic percent: no more than 5.0 total all other refractory elements and no more than 1.0 individual all other transition metals.

A further embodiment of any of the foregoing embodiments may additionally and/or alternatively include the intermetallic matrix being: Nb-27Mo-27Cr-9Al-9Si (in at. %).

A further embodiment of any of the foregoing embodiments may additionally and/or alternatively include the intermetallic matrix having a melting point of: 3100° F. to 3400° F.

A further embodiment of any of the foregoing embodiments may additionally and/or alternatively include the ceramic reinforcement comprising alumina.

A further embodiment of any of the foregoing embodiments may additionally and/or alternatively include the ceramic reinforcement comprising coated SiC fiber.

A further embodiment of any of the foregoing embodiments may additionally and/or alternatively include the coating on the SiC fiber comprising at least one of mullite and alumina.

A further embodiment of any of the foregoing embodiments may additionally and/or alternatively include the ceramic reinforcement comprising a woven preform.

A further embodiment of any of the foregoing embodiments may additionally and/or alternatively include the ceramic reinforcement comprising fibers coated with A15 ($Cr_3Si$) phase-forming metallic elements replacing Si sites.

A further embodiment of any of the foregoing embodiments may additionally and/or alternatively include a turbine engine component comprising a body of the intermetallic matrix composite.

A further embodiment of any of the foregoing embodiments may additionally and/or alternatively include a silicide coating on the body.

A further embodiment of any of the foregoing embodiments may additionally and/or alternatively include a metallic inner member where the body comprises a shell surrounding the metallic inner member.

A further embodiment of any of the foregoing embodiments may additionally and/or alternatively include a method for manufacturing the intermetallic matrix composite. The method comprises: providing a preform of the ceramic reinforcement; infiltrating the preform with molten alloy at a temperature of 3100° F. to 3400° F.; and allowing the alloy to solidify to from the intermetallic matrix.

A further embodiment of any of the foregoing embodiments may additionally and/or alternatively include the infiltration being a vacuum infiltration or a pressure-assisted infiltration.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
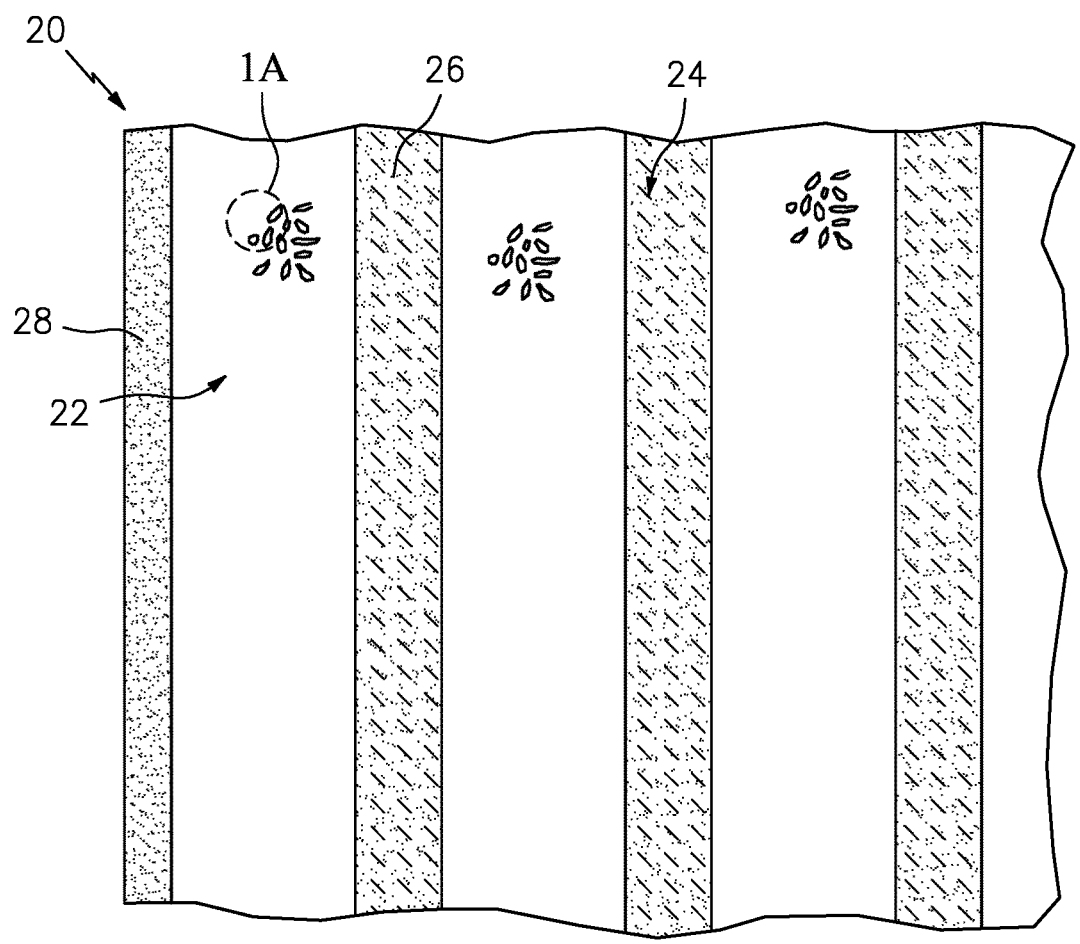
FIG. 1 is a schematicized cross-sectional view of an intermetallic matrix composite (IMC) structure.

Infiltration preparation of a fiber-reinforced high temperature metallic matrix composite or intermetallic matrix composite raises competing considerations. There are competing considerations of matrix pour temperature and fluidity. For sufficient fluidity to achieve infiltration, the pour temperature may be high enough to damage or destroy the fibers.

Use of a eutectic intermetallic matrix composite may provide sufficiently low pour temperature with sufficiently high fluidity to achieve a useful result. In particular, Nb-27Mo-27Cr-9Al-9Si (in at. %) has a melting point of about 3200° F. with high fluidity. Other intermetallics may have too high a melting point ($MoSi_2$— 3686° F.). Yet others may have insufficient fluidity (e.g., $Cr_2Nb$, a single phase intermetallic having a comparable melting point of 3217° F., but unlikely to have sufficient fluidity). Also, the multi-element Nb-27Mo-27Cr-9Al-9Si is likely to give higher creep resistance and a better opportunity to achieve balance of engineering properties than a two-component, single phase, material.

To help withstand infiltration temperatures in the vicinity of 3200° F. or higher, the fibers may be of a high melt or disassociation temperature material or may be coated with such a material. Examples are alumina fibers and alumina-coated SiC fibers. In an example, SiC fibers are coated with alumina via chemical vapor deposition (CVD) prior to weaving or otherwise lacing in a preform mold. Alternative coatings are mullite or mullite-alumina mixtures or layered variations.

In an exemplary process, the monolithic or coated fibers are woven into a preform and placed in a mold (optionally with sacrificial or non-sacrificial cores such as molded alumina or zirconia). An exemplary mold is a sacrificial refractory container (e.g., formed of a refractory metal (e.g., in foil form) such as niobium or molybdenum). Such foil (e.g., folded or pressed to shape) may be a stand-alone mold or may be a liner for a ceramic mold or water-cooled copper mold.

Exemplary components to be molded are turbine engine vanes, blades, blade outer air seals (BOAS) and sub-components thereof. For example, the component could be a blade with airfoil, attachment root, and platform in between. It could be a vane with airfoil, inner diameter (ID) shroud and outer diameter (OD) shroud. Or the component could be an airfoil shell (e.g., replacing a CMC airfoil shell) in a vane wherein the vane has a metallic spar extending spanwise through the shell between ID and OD shrouds.

A master heat of the alloy is prepared via induction or electron beam zone melting techniques. The master heat is then remelted in a crucible to a sufficient heat for needed fluidity. Conventional casting practice is to provide at least 200° F. superheat over the melting point. But because the liquid metal is expected to fill in tight passages within the fiber pre-form and because the alloy is a eutectic composition, upward adjustment in the superheat may be required to provide sufficient fluidity achieve complete infiltration/filling.

The remelt is then poured into the mold, infiltrating the preform. Exemplary infiltration is infiltration is a vacuum infiltration or a pressure-assisted infiltration. The poured material is then cooled (e.g., via withdrawal from the furnace or rapidly if poured in a water cooled copper cavity) to solidify. Mold removal or de-shelling may be performed by mechanical and/or chemical methods (this may include peeling and/or grinding off the foil). Core removal (de-coring) of any sacrificial cores may be via leaching (alkaline and/or acidic) and/or thermo-oxidative process. The relative large cross-sectional thickness of the cores allows them to be leached and/or oxidized out without similar destruction of the fiber reinforcement. Non-sacrificial cores may form liners of passageways or compartments.

By way of schematic example, FIG. 1 shows a turbine engine component having a body formed by composite 20 comprising a matrix 22 and a reinforcement 24. The exemplary reinforcement is formed as a preform of one or more tows of ceramic fibers 26. Exemplary fiber transverse dimension (e.g., diameter is 5.0 μm to 150 μm, more particularly 10 μm to 100 μm or 10 μm to 50 μm.

Figure 1A:
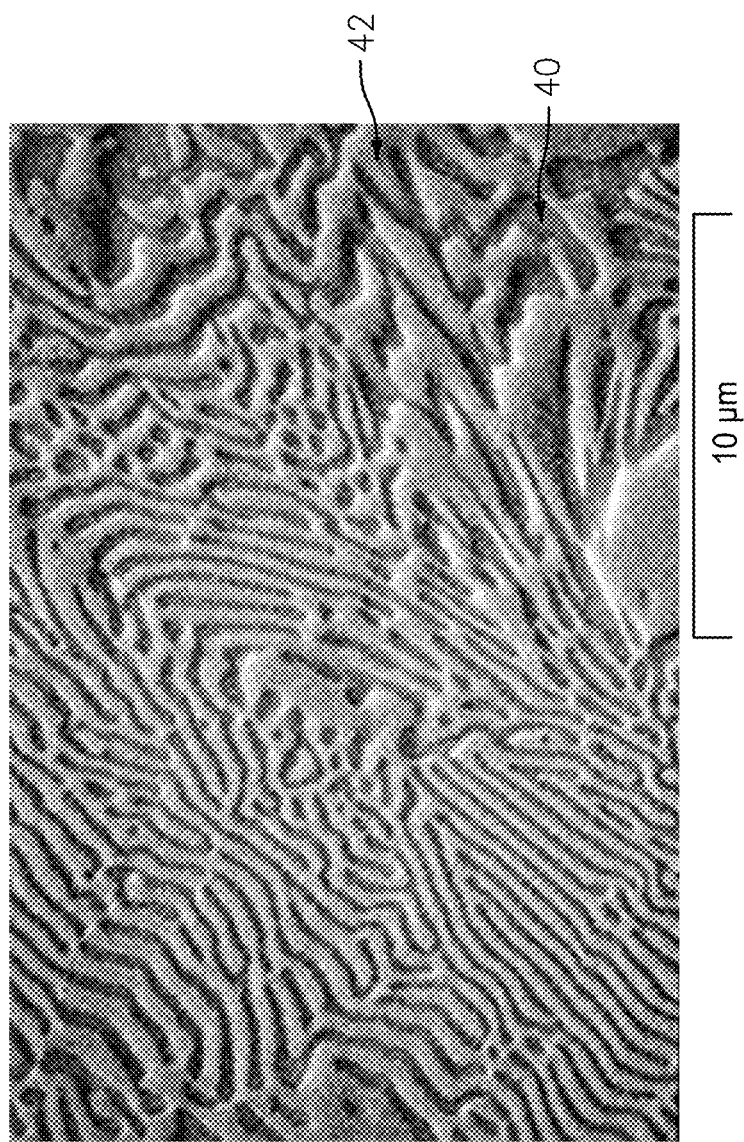
FIG. 1A is an enlarged micrograph view of the matrix of the IMC structure of FIG. 1.

The matrix 22 is essentially a two-phase matrix (e.g., with the two phases 40, 42 (FIG. 1A) accounting for 90% or more of the matrix volume and each accounting for at least 30% of the matrix volume). The first phase 40 is characterized by being of the type $Cr_2Nb$ Laue phase with C14/C15 hexagonal or cubic crystal structure, respectively. The type $Cr_2Nb$ allows some substitutes for either element. For example, Cr may be replaced by Mo, and Nb may be replaced by Ta.

The second phase 42 is characterized by being of the type $Cr_3Si$ with A15 cubic crystal structure. Similarly, the type $Cr_3Si$ allows some substitutes for either element. For example, Cr may be replaced by Mo or Nb and Si may be replaced by Al, Sn, Bi, Sb, Li, and Ga.

Exemplary size of the phases 40 and 42 is 1.0 μm to 5.0 μm, more particularly 1.0 μm to 2.0 μm.

As noted above, a nominal matrix example is 27Mo-27Cr-9Al-9Si (in at. %). More broadly such a material may have (in at. %): 28.0±2.0 Nb; 27.0±2.0 Mo; 27.0±2.0 Cr; 9.0 ±2.0 Si; 9.0 ±2.0 Al; and no more than 10.0 other alloying elements and impurities, if any. Narrower limits on the elemental ranges are ±1.0 and narrower alloying element limit is 5.0 and a narrower impurity limit is 1.0 with an alternate combined alloying elements and impurity limit being 6.0 or 5.0 or 4.0 or 2.0. Exemplary limits on individual alloying elements are 2.0 or 1.0. Exemplary limits on individual impurities are 1.0 or 0.5 or 0.2.

Among additional alloying elements are Sn and Re. Sn in small amounts (e.g., 0.2 to 2.0 atomic %) may improve toughness. Re, in small amounts (e.g., 0.2 to 2.0 atomic %) may improve creep resistance. The upper limits are constrained by their effect on reducing fluidity. Ta may have a similar effect to Re. Due to the fluidity effect, an exemplary limit on refractory elements as alloying elements and impurities is 5.0% total and 2.0% individually, more narrowly 3.0% total and 1.0% for refractories other than said Re.

Among likely minor alloying elements and impurities may be transition metals such as Ni, Co, and Fe. These may also reduce fluidity. An exemplary atomic % limit on transition metals as alloying elements and impurities is 3.0% total and 1.0% individually or, more narrowly, 2.0% and 0.5%, respectively.

Figure 2:
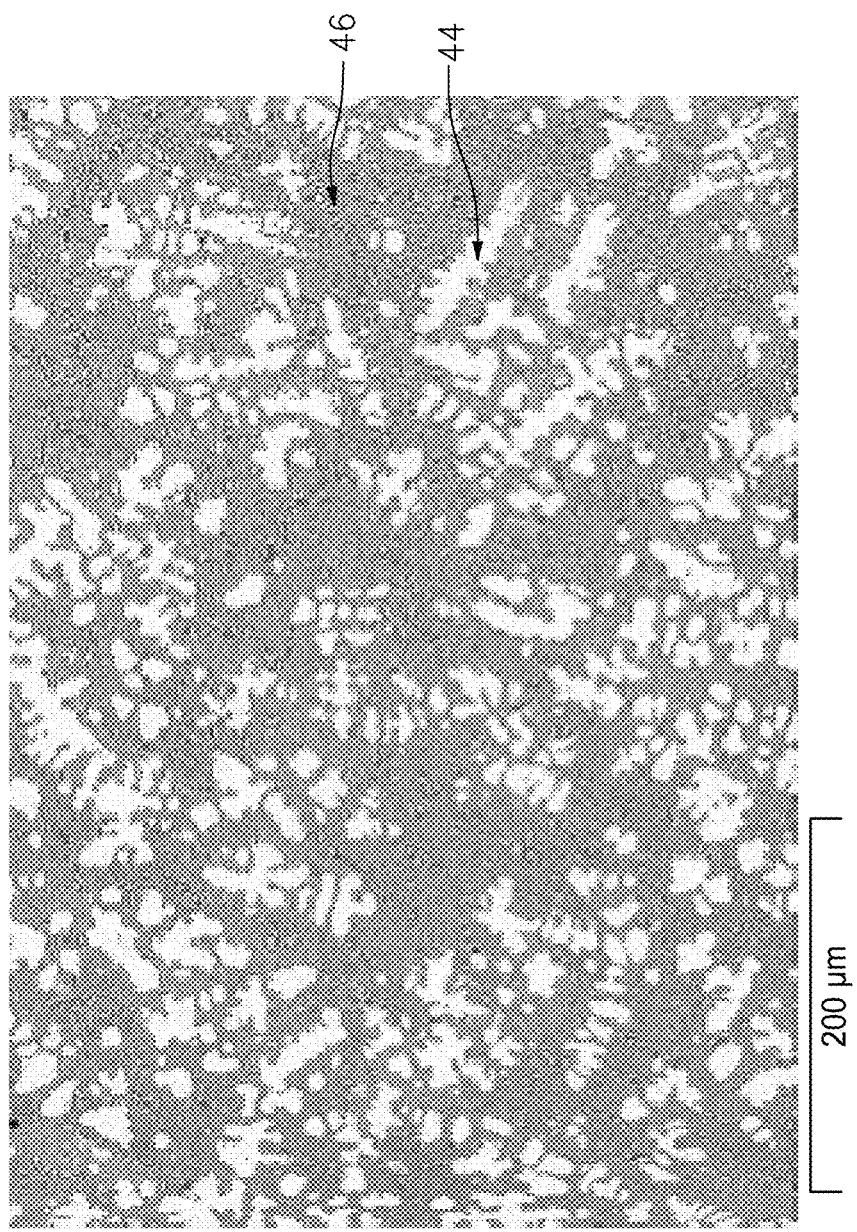
FIG. 2 is an enlarged micrograph view of an alternate matrix of the IMC structure.
Figure 2A:
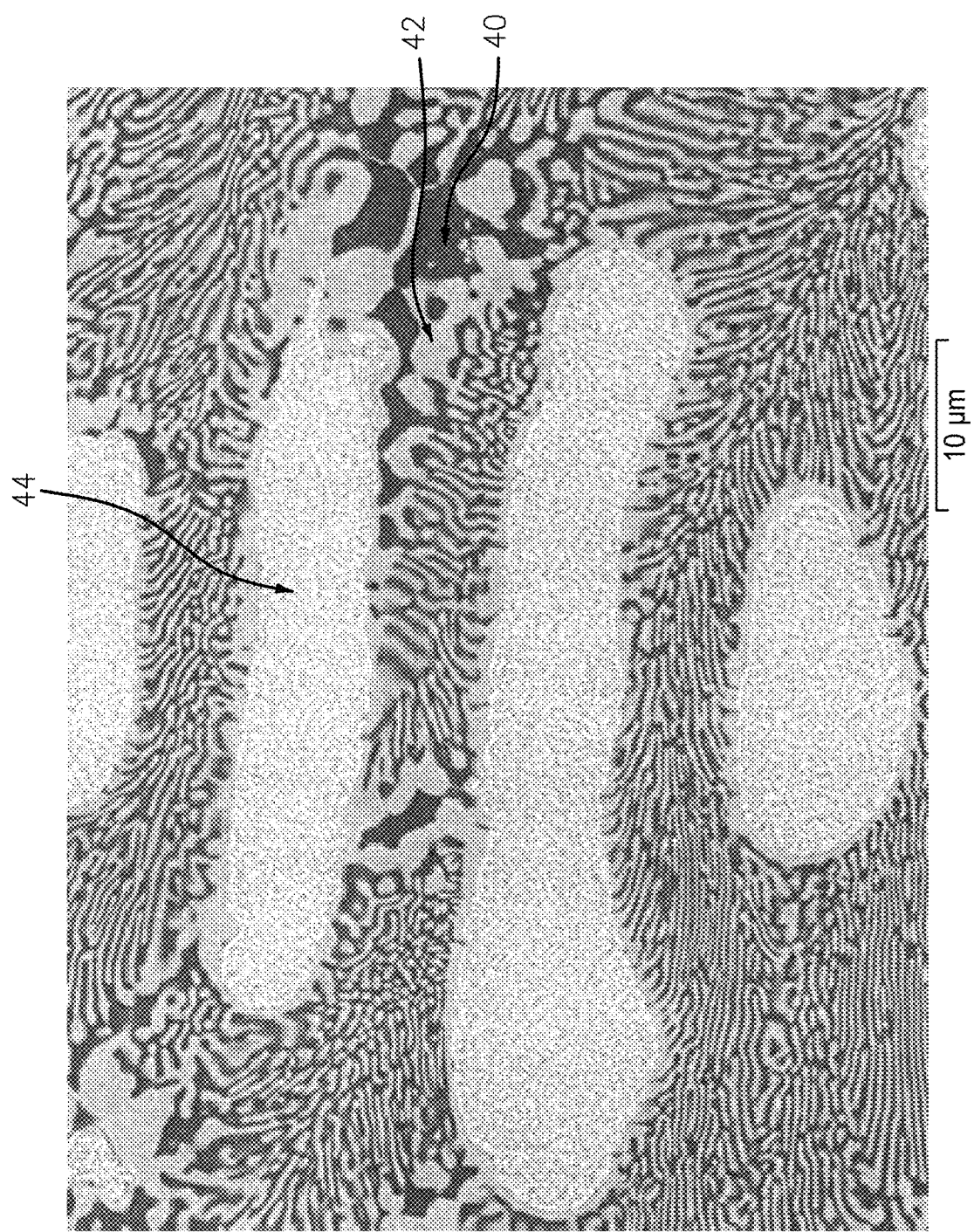
FIG. 2A is a further enlarged micrograph view of the alternate matrix of the IMC structure.

A further matrix variation is a three-phase system (FIG. 2) wherein a third phase 44 is present in a significant volume fraction (e.g., 20% to 40% or 25% to 35%). The exemplary third phase may comprise a majority by weight and volume Nb—Cr—Mo solid solution with A2 structure. FIG. 2 shows this phase dispersed in a field 46 of the phases 40 and 42 (FIG. 2A). The formation of the third phase will depend on cooling parameters, chiefly rate. The third phase may serve to improve ductility but will reduce oxidation resistance. Thus, its formation may be undesirable in most applications. In such a three-phase system, by volume the first phase 40 may account for an exemplary 25% to 50% (e.g., about 35%), the second phase 42 for an exemplary 25% to 50% (e.g., about 35%), and miscellaneous phases, if any up to 10%, or up to 5%. However, even if the third phase 44 forms, a subsequent heat treatment may decompose it back to the phases 40 and 42.

Figure 3:
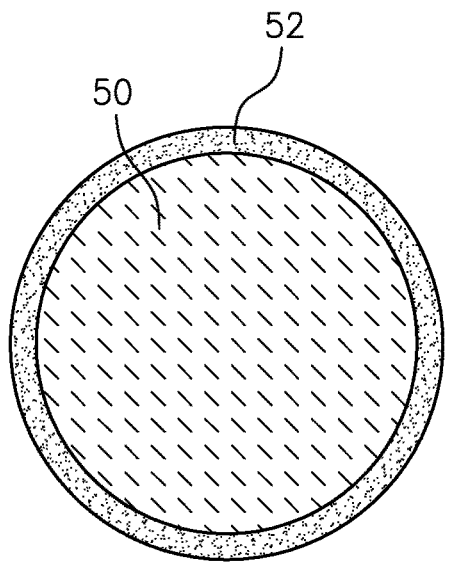
FIG. 3 is a schematicized cross-sectional view of a coated fiber.

If the fibers are coated, exemplary coating thickness is 0.2 μm to 1.5 μm or 0.4 μm to 1.0 μm. FIG. 3 shows a fiber having a substrate 50 (e.g., the SiC noted above) and a coating 52 (e.g., the alumina noted above).

In various implementations, the presence of the reinforcement may improve the strength and/or toughness of the composite relative to the two phase (or three-phase) intermetallic eutectic alone. For this purpose as is conventionally done with ceramic matrix composite (CMC), the fibers may be coated (instead of or over the alumina coating) such that a weak interface bonding is achieved. The weak interface bonding lets the matrix slide with respect to the fiber and any crack formed in the matrix is arrested at the interface. This mechanism improves the fracture toughness of the material. However, this may be balanced with the environmental resistance of the coating (particularly in composites where the fibers extend to the surface and are exposed to the in-use environment), otherwise the extremely weak interface may not allow sufficient load transfer from matrix to the fibers.

In contrast to CMC, the matrix 22 is intermetallic with largely metallic characteristics. If the fibers are ceramic or ceramic-coated, the intermetallic-to-ceramic interface is expected to be weak. But because many other low melting elements such as Ga, Ge, As, Cd, In, Sn, Sb, and Bi can substitute for either Si or Al in forming a high melting intermetallic of the A15 structural form (type) $Cr_3Si$ or $Nb_3Al$, such elements can be used for coating the fibers (e.g., the alumina fibers or SiC fibers or alumina-coated SiC fibers). Especially among these elements, Sn is of great interest because experiments seem to indicate that replacing Al with Sn in the base alloy improves the toughness of the base alloy. Sn is also environmentally advantageous and economical because the coating process may be extremely simple either through liquid immersion or surface-tension driven process (e.g., capillary action or wicking) or vapor deposition.

In the same vein, other metallic elements such as Ni, Co, Ti, Ag, Au, and Pt may also be used in fiber coating to create a weak and environmentally protective interface for the fibers. Considerations of these metallic elements in CMC is generally not made due to their metallic nature. But with the intermetallic matrix, any metallic elements at low concentration can be tolerated without lowering the melting point of the interface.

In a further variation, the entire composite body may bear a coating (e.g., for oxidation resistance, thermal protection, abrasion/mechanical protection and the like). One example of a coating 28 (FIG. 1), which may be a base layer for further coating (not shown), is a silicide. An exemplary silicide is R512E/R522 by Hitemco, Inc., Old Bethpage, N.Y. and may be applied by a slurry process. Similarly some newly developed coatings are two layer coatings, where a first layer of $NbSi_2$ is applied by halide activated packed cementation (HAPC) and a second layer of $MoSi_2$ is applied by supersonic atmospheric plasma spray (SAPS) and may also be applicable. Jia Sun et al. "Silicide Coating Fabricated by HAPC/SAPS Combination to Protect Niobium Alloy from Oxidation", ACS Appl. Mater. Interfaces, May 31, 2016, 201682415838-15847, American Chemical Society, Washington, D.C.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline component configuration, details of such baseline may influence details of particular implementations. Accordingly, other embodiments are within the scope of the following claims.

What is claimed is:

1. An intermetallic matrix composite comprising:
   an intermetallic matrix; and
   a ceramic reinforcement,
   wherein the intermetallic matrix comprises, in atomic percent:
   28.0±2.0 Nb;
   27.0±2.0 Mo;
   27.0±2.0 Cr;
   9.0 ±2.0 Si;
   9.0 ±2.0 Al; and
   no more than 10.0 other alloying elements and impurities, if any.

2. The intermetallic matrix composite of claim 1 wherein the intermetallic matrix comprises a eutectic wherein two phases combine to form at least 60% by volume of the matrix and each is at least 25% by volume of the matrix.

3. The intermetallic matrix composite of claim 2 wherein the two phases are:
   a first phase being of the type $Cr_2Nb$ with C14/C15 crystal structure; and
   a second phase being of the type $Cr_3Si$ with A15 crystal structure.

4. The intermetallic matrix composite of claim 3 wherein the intermetallic matrix comprises a third phase forming 25% to 35% by volume of the matrix and comprising:
   a majority by weight and volume Nb—Cr—Mo solid solution with A2 structure.

5. The intermetallic matrix composite of claim 1 wherein the intermetallic matrix comprises, in atomic percent:
   28.0±1.0 Nb;
   27.0±1.0 Mo;
   27.0±1.0 Cr;

9.0±1.0 Si; and
9.0±1.0 Al.

6. The intermetallic matrix composite of claim 1 wherein the intermetallic matrix further comprises for said other alloying elements, in atomic percent:
0.2 to 2.0 Sn.

7. The intermetallic matrix composite of claim 1 wherein the intermetallic matrix further comprises for said other alloying elements, in atomic percent:
0.2 to 2.0 Re.

8. The intermetallic matrix composite of claim 1 wherein the intermetallic matrix further comprises for said other alloying elements, in atomic percent:
0.2 to 2.0 Sn and 0.2 to 2.0 Re.

9. The intermetallic matrix composite of claim 1 wherein the intermetallic matrix further comprises, in atomic percent:
no more than 5.0 total all other refractory elements and no more than 1.0 individual all other transition metals.

10. The intermetallic matrix composite of claim 1 wherein the intermetallic matrix is:
Nb-27Mo-27Cr-9Al-9Si (in at. %).

11. The intermetallic matrix composite of claim 1 wherein the intermetallic matrix has a melting point of:
3100° F. to 3400° F.

12. The intermetallic matrix composite of claim 1 wherein the ceramic reinforcement comprises:
alumina.

13. The intermetallic matrix composite of claim 1 wherein the ceramic reinforcement comprises:
coated SiC fiber.

14. The intermetallic matrix composite of claim 13 wherein the coating on the SiC fiber comprises:
at least one of mullite and alumina.

15. The intermetallic matrix composite of claim 1 wherein the ceramic reinforcement comprises:
a woven preform.

16. The intermetallic matrix composite of claim 1 wherein the ceramic reinforcement comprises:
fibers coated with A15($Cr_3Si$) phase-forming metallic elements replacing Si sites.

17. A turbine engine component comprising a body of the intermetallic matrix composite of claim 1.

18. The turbine engine component of claim 17 further comprising:
a silicide coating on the body.

19. A method for manufacturing the intermetallic matrix composite of claim 1, the method comprising:
providing a preform of the ceramic reinforcement;
infiltrating the preform with molten alloy at a temperature of 3100° F. to 3400° F.; and
allowing the alloy to solidify to from the intermetallic matrix.

20. The method of claim 19 wherein:
the infiltration is a vacuum infiltration or a pressure-assisted infiltration.

\* \* \* \* \*